United States Patent
Kim et al.

(10) Patent No.: US 10,139,486 B2
(45) Date of Patent: Nov. 27, 2018

(54) SYSTEM FOR PREDICTING PATH OF CONVECTIVE CELL AND CONTROL METHOD THEREOF

(71) Applicant: Korea Meteorological Administration, Seoul (KR)

(72) Inventors: Ji Young Kim, Bucheon-si (KR); Jeong Seok Ko, Seoul (KR); Hi Jun Yang, Seoul (KR); Tae Sun Kwon, Yongin-si (KR); Seung Jun Oh, Seoul (KR); Jeong Deok Lee, Seoul (KR); Mi Young Park, Tongyeong-si (KR); Gyu Won Lee, Daegu (KR); Sung Hwa Jung, Daegu (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 479 days.

(21) Appl. No.: 14/848,112

(22) Filed: Sep. 8, 2015

(65) Prior Publication Data

US 2017/0067992 A1    Mar. 9, 2017

(51) Int. Cl.
*G01S 13/95* (2006.01)
*G01W 1/00* (2006.01)
*G01W 1/10* (2006.01)

(52) U.S. Cl.
CPC ............ *G01S 13/95* (2013.01); *G01S 13/951* (2013.01); *G01W 1/00* (2013.01); *G01W 1/10* (2013.01); *Y02A 90/18* (2018.01)

(58) Field of Classification Search
CPC .................. G01S 13/95–13/958; G01W 2001/003–2001/006; G01W 2203/00
See application file for complete search history.

(56) References Cited

U.S. PATENT DOCUMENTS

| | | | | |
|---|---|---|---|---|
| 5,517,193 A | * | 5/1996 | Allison | G01S 13/95 342/26 R |
| 7,733,264 B1 | * | 6/2010 | Woodell | G01S 13/953 342/175 |
| 8,319,679 B2 | * | 11/2012 | Christianson | G01S 13/953 342/26 A |
| 8,649,553 B2 | * | 2/2014 | Costes | G01W 1/10 342/26 R |
| 9,507,022 B1 | * | 11/2016 | Breiholz | G01S 13/953 |
| 9,613,269 B2 | * | 4/2017 | Kilty | G06K 9/00476 |

FOREIGN PATENT DOCUMENTS

KR    10-0931950    12/2009

* cited by examiner

*Primary Examiner* — Matthew M Barker
(74) *Attorney, Agent, or Firm* — Heedong Chae; Lucem, PC (57) ABSTRACT

The present invention discloses a system for predicting a path of a connective cell and a control method thereof. According to the invention, a connective cell is detected in a weather radar image, and a path of the detected convective cell is predicted on the basis of a plurality of information stored in advance, thereby guiding various kinds of information about the connective cell including lightning in advance.

9 Claims, 12 Drawing Sheets
(5 of 12 Drawing Sheet(s) Filed in Color)

POSITIONAL ERROR ACCORDING TO α AND NUMBER OF MINIMUM HISTORIES, PREDICTION TIME 30 MINUTES

| *predict 30m | 0.1 | 0.2 | 0.3 | 0.4 | 0.5 | 0.6 | 0.7 | 0.8 | 0.9 | 1 |
|---|---|---|---|---|---|---|---|---|---|---|
| 10 | 9.655 | 9.655 | 9.655 | 9.655 | 9.655 | 9.655 | 9.655 | 9.655 | 9.655 | 9.655 |
| 20 | 8.555 | 8.209 | 8.208 | 7.926 | 7.833 | 7.833 | 7.815 | 7.807 | 7.807 | 7.811 |
| 30 | 8.614 | 7.632 | 7.35 | 7.2 | 7.087 | 7.087 | 7.072 | 7.069 | 7.705 | 7.087 |
| 40 | 8.125 | 7.491 | 7.114 | 6.899 | 6.724 | 6.724 | 6.7 | 6.695 | 6.703 | 6.721 |
| 50 | 8.341 | 7.726 | 7.331 | 7.087 | 6.875 | 6.875 | 6.845 | 6.84 | 6.85 | 6.87 |
| 60 | 8.435 | 7.685 | 7.179 | 6.87 | 6.652 | 6.652 | 6.646 | 6.662 | 6.689 | 6.72 |
| 70 | 8.092 | 7.4 | 6.908 | 6.593 | 6.337 | 6.337 | 6.327 | 6.353 | 6.396 | 6.444 |
| 80 | 8.202 | 7.443 | 6.913 | 6.573 | 6.336 | 6.336 | 6.333 | 6.362 | 6.402 | 6.449 |
| 90 | 8.307 | 7.613 | 7.108 | 6.739 | 6.41 | 6.41 | 6.396 | 6.425 | 6.468 | 6.516 |
| 100 | 7.92 | 7.319 | 6.893 | 6.608 | 6.286 | 6.286 | 6.219 | 6.195 | 6.21 | 6.246 |
| 110 | 8.113 | 7.537 | 7.111 | 6.795 | 6.431 | 6.431 | 6.368 | 6.372 | 6.405 | 6.457 |
| 120 | 8.33 | 7.623 | 7.097 | 6.713 | 6.283 | 6.283 | 6.219 | 6.227 | 6.272 | 6.346 |

WHEN α = 0.7, POSITIONAL ERROR RANGE

| | predict 30m |
|---|---|
| 10 | 8.468 |
| 20 | 6.164 |
| 30 | 5.256 |
| 40 | 4.908 |
| 50 | 5.004 |
| 60 | 4.761 |
| 70 | 4.529 |
| 80 | 4.202 |
| 90 | 4.261 |
| 100 | 4.391 |
| 110 | 4.399 |
| 120 | 4.246 |

POSITIONAL ERROR ACCORDING TO α AND NUMBER OF MINIMUM HISTORIES, PREDICTION TIME 60 MINUTES

| *predict 60m | 0.1 | 0.2 | 0.3 | 0.4 | 0.5 | 0.6 | 0.7 | 0.8 | 0.9 | 1 |
|---|---|---|---|---|---|---|---|---|---|---|
| 10 | 18.597 | 18.597 | 18.597 | 18.597 | 18.597 | 18.597 | 18.597 | 18.597 | 18.597 | 18.597 |
| 20 | 16.292 | 15.576 | 15.207 | 14.998 | 14.801 | 14.801 | 14.76 | 14.472 | 14.738 | 14.746 |
| 30 | 15.546 | 14.406 | 13.793 | 13.468 | 13.207 | 13.207 | 13.17 | 13.165 | 13.181 | 13.212 |
| 40 | 15.549 | 14.213 | 13.423 | 12.982 | 12.632 | 12.632 | 12.582 | 12.572 | 12.589 | 12.622 |
| 50 | 15.439 | 14.123 | 13.285 | 12.8 | 12.388 | 12.388 | 12.331 | 12.325 | 12.352 | 12.402 |
| 60 | 15.927 | 14.325 | 13.237 | 12.555 | 11.962 | 11.962 | 11.882 | 11.885 | 11.931 | 12.003 |
| 70 | 15.16 | 13.678 | 12.622 | 11.911 | 11.344 | 11.344 | 11.286 | 11.297 | 11.341 | 11.412 |
| 80 | 15.27 | 13.688 | 12.575 | 11.798 | 11.144 | 11.144 | 11.118 | 11.167 | 11.248 | 11.35 |
| 90 | 15.345 | 13.938 | 12.847 | 12.036 | 11.151 | 11.151 | 11.031 | 11.039 | 11.117 | 11.225 |
| 100 | 14.87 | 13.64 | 12.682 | 11.952 | 11.015 | 11.015 | 10.781 | 10.693 | 10.711 | 10.781 |
| 110 | 15.252 | 13.964 | 12.989 | 12.176 | 11.071 | 11.071 | 10.862 | 10.834 | 10.884 | 11.001 |
| 120 | 15.477 | 14.013 | 12.904 | 12.063 | 11.094 | 11.094 | 10.892 | 10.835 | 10.901 | 11.083 |

WHEN α = 0.7, POSITIONAL ERROR RANGE

| | predict 60m |
|---|---|
| 10 | 16.002 |
| 20 | 11.188 |
| 30 | 9.263 |
| 40 | 8.441 |
| 50 | 8.04 |
| 60 | 8.283 |
| 70 | 7.438 |
| 80 | 7.205 |
| 90 | 7.105 |
| 100 | 7.107 |
| 110 | 7.882 |
| 120 | 7.097 |

SYSTEM FOR PREDICTING PATH OF CONVECTIVE CELL AND CONTROL METHOD THEREOF

CROSS-REFERENCE TO RELATED APPLICATION

This application claims the benefit of Korean Application No. 10-2014-0167744 filed on Nov. 27, 2014 with the Korean Intellectual Property Office, the disclosure of which is incorporated herein by reference.

BACKGROUND OP THE INVENTION

1. Field of the Invention

The present invention relates to a system for predicting a path, of a convective cell and a control method thereof, and more particularly, to a system for predicting a path of a convective cell and a control method thereof, which detects a convective cell in a weather radar image and predicts a path of the detected convective cell on the basis of a plurality of information stored in advance.

2. Description of the Related Art

A weather radar is an equipment which emits an electromagnetic wave and then calculates a magnitude of an electric wave reflected or diffused from, a meteorological target, and is one of remote sensing equipments which monitors a wide area (for example, an effective observation radius of about 240 km) very rapidly (for example, every 10 minutes) and calculates a rainfall of the wide area.

Such a weather radar detects a convective cell in a monitoring area, but does not provide a method for predicting a path of the convective cell.

PRIOR ART DOCUMENT

Patent Document (Patent Document 1) Korean Registered Patent No. 10-0931950, titled "METHOD OF CLASSIFYING RAINFALL TYPE OF WEATHER RADAR"

SUMMARY OF THE INVENTION

An object of the invention is to provide a system for predicting a path of a convective cell, which detects a convective cell in a weather radar image and predict a path of the detected convective cell on the basis of a plurality of information stored in advance, and a control method thereof.

A system for predicting a path of a convective cell according to an embodiment of the invention may include: a weather radar center system that detects one or more connective cells present in a radar image detected through a weather radar, and transmits information about one or more detected connective cells; and a terminal that predicts development of the connective cell based on linear increase or decrease on the basis of the information of one or more transmitted connective cells and past information that is preset information about a connective cell tracked in past, and displays a development prediction result of one or more connective cell.

As an example according to the invention, the terminal may predict a plurality of paths for each preset prediction time.

As an example according to the invention, the terminal may predict the development of one or more convective cells on the basis of change tendency of the connective cell tracked in the past and analyzed from the past information that is the preset information about the convective cell tracked in the past.

As an example according to the invention, the development prediction result of the connective cell may be that, on the basis of the number of references of the preset past information, a positional error range is decreased as the number of references gets more, and the positional error range is increased as the number of references gets less.

A control method of a system for predicting a path of a connective cell according to an embodiment of the invention may include: detecting, through a weather radar center system, one or more connective cells present in a radar image detected, and transmitting information about one or more detected connective cells to the terminal; predicting, through a terminal, development of the convective cell based on linear increase or decrease on the basis of the information of one or more transmitted convective cells and past information that is preset information about a convective cell tracked in past; and displaying, through the terminal, a development prediction result of one or more convective cell.

As an example according to the invention, in the predicting of the development of convective cell, the development of the connective cell of one or more convective cells may be predicted on the basis of change tendency of the convective cell tracked in the past and analyzed from the preset past information.

According to the invention, a convective cell is detected connective cell is predicted on the basis of a plurality of information stored in advance, thereby guiding various kinds of information about the convective cell including lightning in advance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 is a diagram illustrating a positional erorr range according to an embodiment of the invention.

DETAILED DESCRIPTION OF THE PREFERRED EMBODIMENTS

Technical terms used in the invention are used merely to describe a specific embodiment, and it should be noted that they do not restrict the invention. In addition, technical terms used in the invention should be interpreted as the meaning generally understood by those skilled in the art unless they are defined particularly as the other meaning in the invention, and they should not be interpreted as excessively comprehensive meaning or excessively contracted meaning. In addition, when technical terms used in the invention are wrong technical terms which do not accurately express the spirit of the invention, they should be substituted and understood by technical terms which those skilled in the art can rightly understand. In addition, general terms used in the invention should be interpreted according to definition in dictionaries or according to context before and after, and should not be interpreted as excessively contracted meaning.

In addition, singular expression used in the invention includes plural expression unless it is not clearly different on context. In the invention, terms such as "comprise" and "include" should not be interpreted as necessarily including all various constituent elements or various steps described in the invention, and should be interpreted as that some constituent elements or some steps of them may not be included or additional constituent elements or steps may be further included.

In addition, terms including ordinals such as "first" and "second" used in the invention may be used to describe constituent elements, but the constituent elements should not be restricted by the terms. Terms are used only to distinguish one constituent element from the other constituent elements. For example, a first constituent element may be named as a second constituent element while not deviating from a right scope of the invention, and similarly, the second constituent element may be also named as the first constituent element.

Hereinafter, preferred embodiments according to the invention will be described in detail, the same reference numerals are given to the same or similar constituent elements irrespective of the drawing signs, and the repeated description thereof is omitted.

In addition, in the description of the invention, when it is determined that specific description about the related known technique may blur the gist of the invention, detailed description thereof is omitted. In addition, the accompanying drawings are only to easily understand the spirit of the invention, and it should not be interpreted that the spirit of the invention is restricted by the accompanying drawings.

Figure 1:
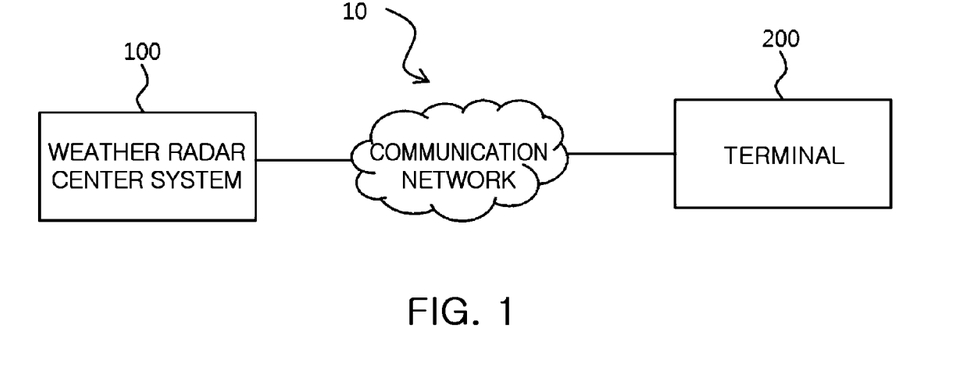
FIG. 1 is a block diagram illustrating a configuration of a system for predicting a path of a convective cell according to an embodiment of the invention.

FIG. 1 is a block diagram illustrating a configuration of a system 10 for predicting a path of a convective cell according to an embodiment of the invention.

As illustrated in FIG. 1, the system 10 for predicting a path of a convective cell includes a weather radar center system 100 and a terminal 200. All constituent elements of the system 10 for predicting a path of a convective cell illustrated in FIG. 1 are not essential constituent elements, the system 10 for predicting a path of a convective cell may be embodied by constituent elements more than the constituent elements illustrated in FIG. 1, and the system 10 for predicting a path of a convective cell may be embodied even by constituent elements less than those.

The weather radar center system 100 detects one or more convective cells present in a radar image detected (captured, collected, observed, or sensed) through a weather radar (not illustrated).

In other words, the weather radar center system 100 generates a 3-dimensional CAPPI (constant altitude plan position indicator), and distinguishes a reflectivity cell related to risk weather. In this case, the generating of the 3-dimensional CAPPI is a step of performing coordinate conversion of radar reflectivity data. In addition, the distinguishing of the reflectivity cell related to the risk weather is a step of detecting a connective cell (or a convective storm) from the coordinate-converted 3-dimensional CAPPI data, and quantifying and providing a property of the detected convective cell.

Figure 2:
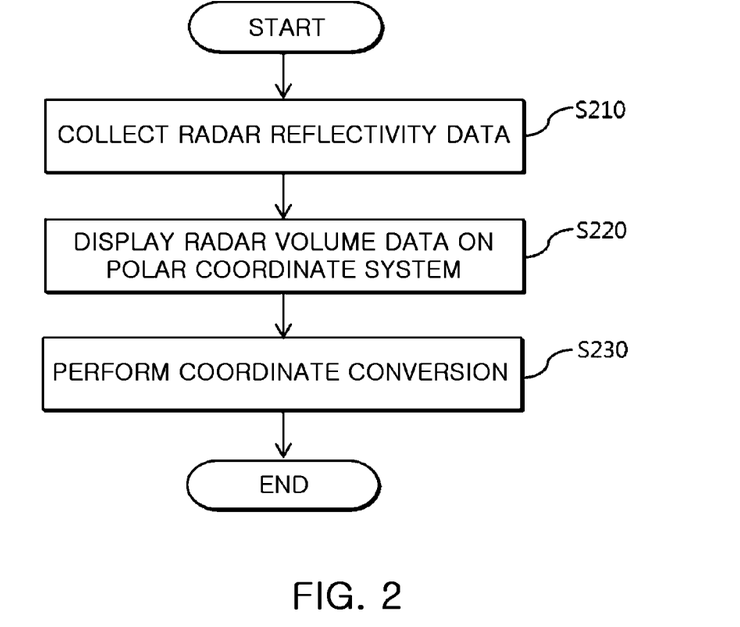
FIG. 2 is a flowchart illustrating a process of generating a 3-dimensional CAPPI according to an embodiment of the invention.

Herein, the process of generating the 3-dimensional CAPPI is performed as illustrated in FIG. 2.

The weather radar center system 100 collects radar reflectivity data (S210).

In addition, the weather radar center system 100 displays the collected radar reflectivity data on a polar coordinate system by radar volume data (S220).

In addition, the weather radar center system 100 performs coordinate conversion for the radar volume data. In other words, the weather radar center system 100 converts the radar volume data, displayed on the polar coordinate system into a 3-dimensional reflectivity field of an orthogonal coordinate system (S230).

Accordingly, the weather radar center system 100 generates 3-dimensional CAPPI (or grid) data.

Figure 3:
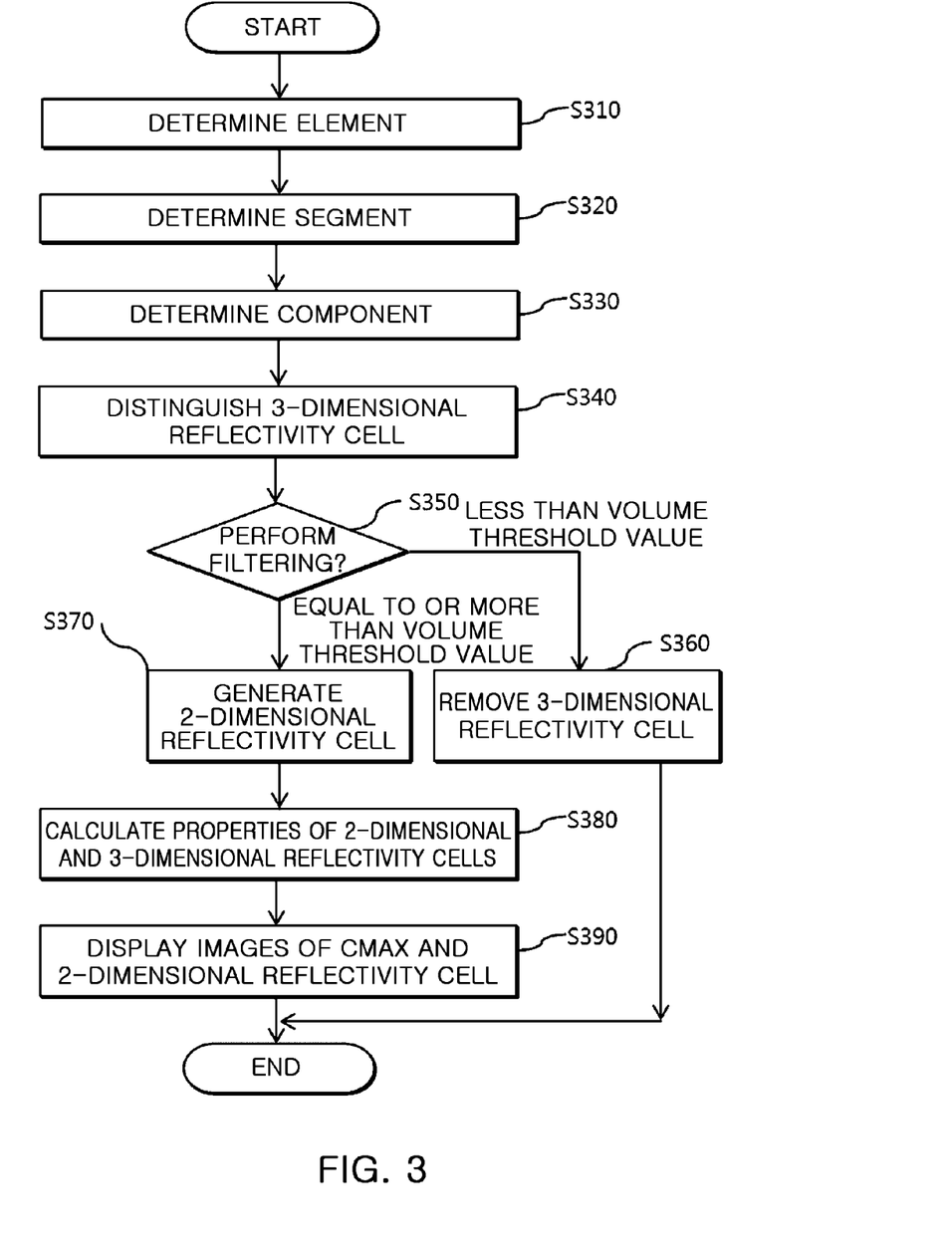
FIG. 3 is a flowchart illustrating a procedure of distinguishing a reflectivity cell related to risk weather according to an embodiment of the invention.

In addition, the process of distinguishing the reflectivity cell related to the risk weather is performed as illustrated in FIG. 3.

The weather radar center system 100 detects a convective storm from the 3-dimensional CAPPI data gradually distinguishing a 1-dimensional segment, a 2-dimensional component, and a 3-dimensional component (storm 3D) from the grid elements. In this case, the determination of the grid elements uses a preset reflectivity threshold value.

In other words, the weather radar center system 100 determines all the grid elements having reflectivity more than the reflectivity threshold value in the 3-dimensional radar reflectivity data, gives (or sets) individual identification numbers to all the determined grid elements, and determines the elements (S310).

In addition, the weather radar center system 100 searches x coordinates and y coordinates of all the grid elements, determines grid elements, y coordinates of which are the same and x coordinates are adjacent, as 1-dimensional segments, and gives identification, numbers to the determined 1-dimensional segments (S320).

In addition, the weather radar center system 100 searches y coordinates of all the 1-dimensional segments, and determines 1-dimensional segments, y coordinates of which are adjacent, as 2-dimensional components (S330).

In addition, the weather radar center system 100 searches all the 2-dimensional components in a 2-direction (or a vertical direction), and determines 2-dimensional components, z coordinates of which are adjacent, as 3-dimensional components (storm 3D), that is, 3-dimensional reflectivity cells (S340).

As described above, the weather radar center system 100 uses a preset threshold method to determine the reflectivity cell (or the convective cell) related to the risk weather (for example, including thunderstorm, hailstone, downpour, and the like) in the 3-dimensional radar reflectivity data. In the embodiment of the invention, the convective cell is determined using the reflectivity threshold value and the volume threshold value.

In addition, the weather radar center system 100 performs filtering on the basis of the volume threshold value preset for the 3-dimensional radar reflectivity cell.

In other words, the weather radar center system 100 confirms (determines or filters) whether there is a value smaller than the volume threshold value in the 3-dimensional radar reflectivity cells (S350).

When there is a 3-dimensional component (storm 3D) with a volume smaller than the volume threshold value as the confirmation result, the weather radar center system 100 excludes the 3-dimensional component with a volume smaller than the volume threshold value in the final determination (S360).

In addition, when there is a 3-dimensional component with a volume equal to or more than the volume threshold value as the confirmation result, the weather radar center system 100 projects the 3-dimensional component onto an x-y plane, and determines it as a 2-dimensional reflectivity cell (storm 2D).

In other words, the weather radar center system 100 projects the determined 3-dimensional component (storm 3D) onto the 2-dimensional x-y plane, converts it into a 2-dimensional reflectivity cell, and displays the converted 2-dimensional reflectivity cell. In this case, the 3-dimensional reflectivity cell with a volume larger than the volume threshold value is detected as a convective cell, and the 2-dimensional reflectivity cell is displayed as an ellipse (S370).

In addition, the weather radar center system 100 calculates, from the 3-dimensional reflectivity cell and the 2-dimensional reflectivity cell, 3-dimensional property information, (for example, including 3-dimensional center position, volume, maximum reflectivity, average reflectivity, altitude and position of maximum reflectivity, and the like) and 2-dimensional property information (for example, including area, center position, lengths of major axis and minor axis of representative ellipse, inclination of major axis, vertically integrated liquid-water content, vertically integrated liquid-water content density, upper layer vertically integrated liquid-water content, and the like), and provide quantitative numerical information (S380).

In addition, the weather radar center system 100 displays a CMAX (column maximum) image and a storm 2D image on the basis of the detected convective cell and the calculated property information. In this case, the CMAX image is that only the strongest echo part in each column of volume detection data is expressed on a plane (S390).

As described above, the weather radar center system 100 can calculate a property of the determined 3-dimensional, reflectivity cell through the filtering of the determined 3-dimensional reflectivity cell, the conversion into the 2-dimensional reflectivity cell, and the process of calculating property information from each of the 2-dimensional and 3-dimensional reflectivity cells.

In addition, the weather radar center system 200 transits the information (for example, including the calculated property information of the 3-dimensional reflectivity cell, the calculated property information of the 2-dimensional reflectivity cell) about one or more detected convective cells to the terminal 200.

The terminal 200 may be applied to various terminals such as smart phone, portable terminal, mobile terminal, personal digital assistant (PDA), PMP (portable multimedia player) terminal, telematics terminal, navigation terminal, personal computer, laptop computer, slate PC, tablet PC, ultrabook, wearable device (for example, including smart watch, smart glass, HMD (head mounted display)., and the like), Wibro terminal, IPTV (internet protocol television) terminal, smart TV, digital broadcasting terminal, AVN (audio video navigation) terminal, A/V (audio/video) system, and flexible terminal.

Figure 4:
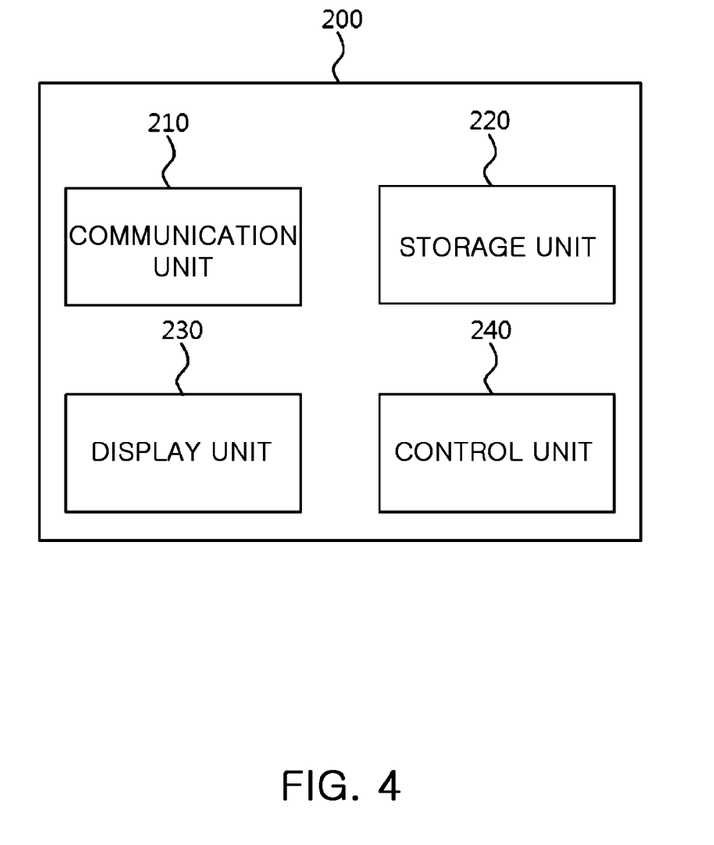
FIG. 4 is a block diagram illustating a configuration of a terminal according to an embodiment of the invention.

In addition, as illustrated in FIG. 4, the terminal. 200 includes a communication unit 210, a storage unit 220, a display unit 230, and a control unit 240. All the constituent elements of the terminal 200 illustrated in FIG. 4 are not essential constituent elements, the terminal 200 may be embodied by constituent elements more than the constituent elements illustrated in FIG. 4, and the terminal 200 may be embodied by constituent elements less than those.

The communication unit 210 is connected in communication to an internal arbitrary constituent element or at least one arbitrary external terminal through wire/wireless communication network. In this case, the arbitrary external terminal may include the weather radar center system 100 and the like. In this case, a wireless internet technique may include wireless LAN (WLAN), Wibro (Wireless Broadband), Wimax (world interoperability for microwave access), HSDPA (high speed downlink packet access), IEEE 802.16, long term evolution (LTE), wireless mobile broadband service (WMBS), and the like. In addition, a short-range communication technique may Include Bluetooth, Wi-Fi, RFID (radio frequency identification), infrared data association (IrDA), UWB (ultra wideband), ZigBee, near field communication (NFC), ultra sound communication (USC), visible light communication (VLC), BLE (Bluetooth Low Energy), and the like. In addition, a wire communication technique may include power line communication (PLC), USB communication, Ethernet, serial communication, optical/coaxial cable, and the like.

In addition, the communication unit 210 can transmit and receive information to and from the terminal through a universal serial bus (USB).

In addition, the communication unit 210 receives the information about one or more detected convective cells transmitted from the weather radar center system 100.

The storage unit 220 stores various user interface (UI), graphic user interface (GUI), and the like.

In addition, the storage unit 220 stores data and programs necessary to operate the terminal 200.

In addition, the storage unit 220 may include at least one storage medium of flash memory type, hard disk type, multimedia card micro type, card type memory (for example, SD or XD memory, and the like), magnetic memory, magnetic disk, optical disk, RAM (random Access memory), SRAM (static random access memory), ROM (read-only memory), EEPROM (electrically erasable programmable read-only memory), and PROM (programmable read only memory). In addition, the terminal 200 may operate a web storage which performs a storage function of the storage unit 220 on the internet, or may be operated in association with the web storage.

In addition, the storage unit 220 stores the information about one or more detected connective cells, and the like, received through the communication unit 210.

The display unit 230 can display various contents such as various menu screens using the user interface and/or the graphic user interface stored in the storage unit 220 by the control of the control unit 240. In this case, the contents displayed on the display unit 230 include various texts or image data (including various kinds of information data) and a menu screen including data such as icons, list menu, and combo box. In addition, the display unit 230 may be a touch screen.

In addition, the display unit 230 may include at least one of a liquid crystal display (LCD), a thin film transistor-liquid crystal display (TFT LCD), an organic light-emitting diode (OLED), a flexible display, a 3D display, an e-ink display, and an LED (light emitting diode).

In addition, the display unit 230 displays the information about one or more detected convective cells received through the communication unit 210 by the control of the control unit 240.

The control unit 240 performs an overall control function of the terminal 200.

In addition, the control unit 240 predicts a development of convective cell based on linear increase or decrease on the basis of the received information of one or more convective cells and preset past information (or information about a convective cell tracked in the past) (for example, including a tracking result of a convective cell in which lightning was observed in the past, a tracking result of a convective cell in which lightning was not observed in the past, a path of a convective cell in which lightning was not observed in the past, and the like). In this case, the terminal 200 can predict a plurality of paths (or a plurality of paths for each prediction time) according to a first time, a second time, and the like which are preset.

In other words, the terminal 200 predicts development of one or more received convective cells on the basis of the preset past information (for example, 6 pieces of past information in minimum), under the assumption that a storm tends to move along a straight line and growth and disappearance of the storm is taken along a linear tendency. In this case, when the development of one or more received convective cells is predicted, the terminal 200 can reflect (or apply) linear increase or decrease and/or parabolic increase or decrease about movement and strength of the convective cell. In addition, the terminal 200 predicts development of one or more received convective cells on the basis of (or with reference to) the past, change tendency (or change tendency of the convective cell tracked in the past analyzed from the convective cell tracked in the past) analyzed from the preset past information. In this case, the linear increase or decrease includes (or corresponds to) a change rate according to the time calculated with an exponentially decreased weight from the past information. For example, the change rate (0<α≤1) is represented by alpha, and is set to 0.7 in the embodiment of the invention. In this case, the change rate of 0.7 is a value set on the basis of detected and tracked convective cell data of Korean summer.

Figure 5:
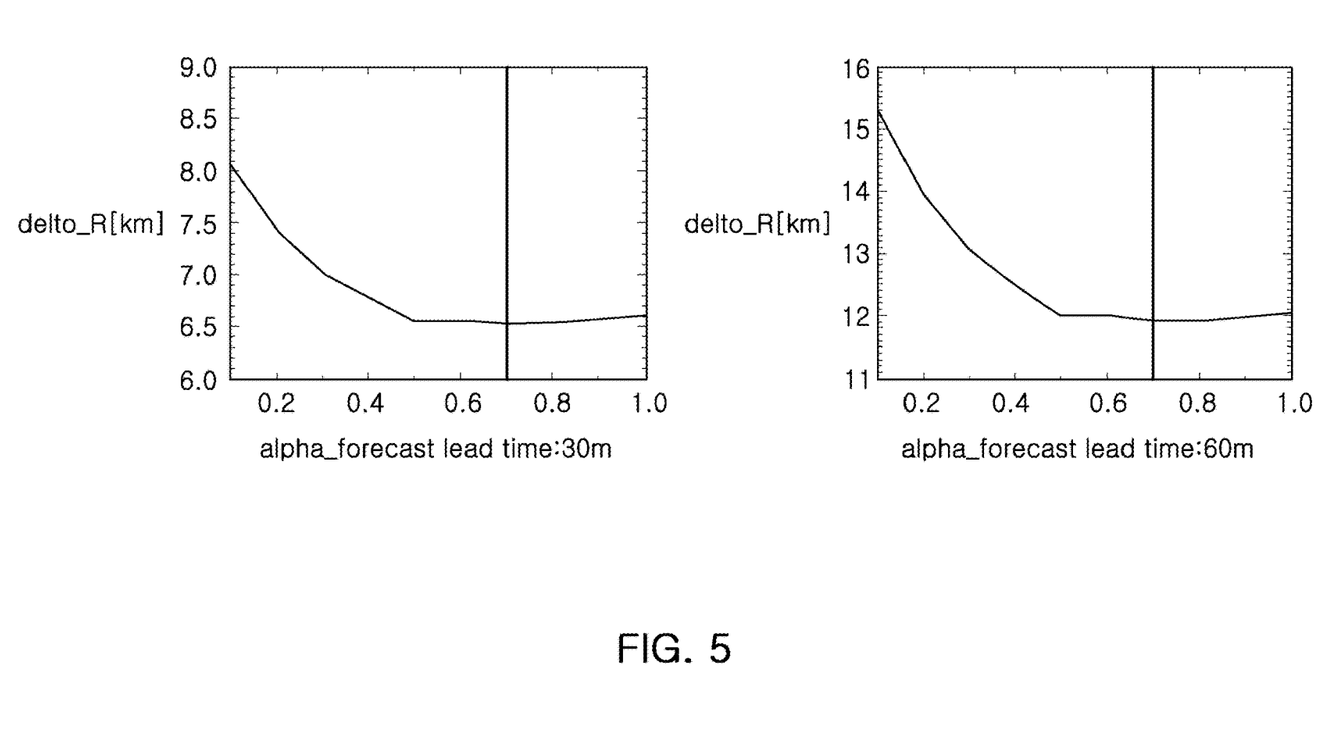
FIG. 5 is a diagram illustrating a positional error based on a change rate according to an embodiment of the invention.

In other words, when the tracked convective cell in the past can be tracked for 30 minutes or more, as illustrated, in FIG. 5 representing a positional error according to the change rate (or the alpha value), the control unit 240 applies 0.7 representing an error with the least change rate through a result using a plurality of minimum histories.

Figure 6:
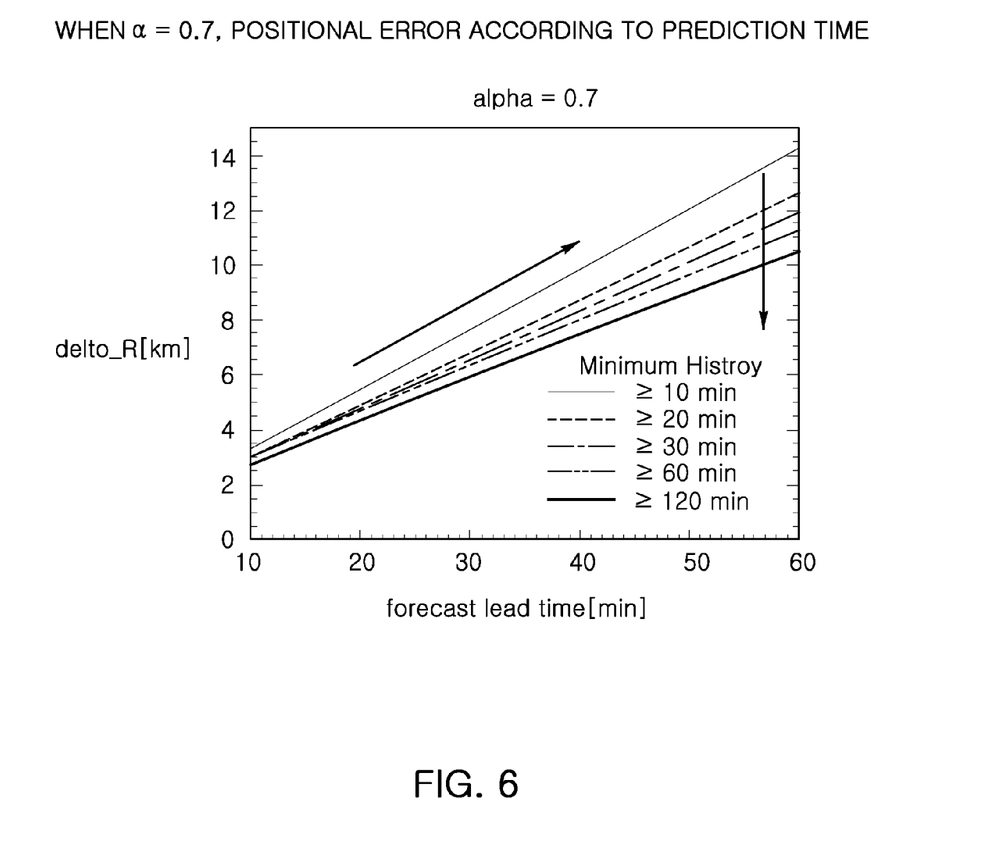
FIG. 6 is a diagram illustrating a positional erorr and range based on the number of minimum histories according to an embodiment of the invention.

In addition, as illustrated in FIG. 6, as the prediction time gets longer, the positional error gets larger, and thus it is possible to determine a positional error and a range according to the number of minimum histories.

In addition, as the number of tracked minimum histories gets larger, the predicted positional error gets smaller.

In addition, the control unit 240 differently applies the positional error range according to the number of references (or citations) of the past data.

In other words, as illustrated in FIG. 7, the control unit 240 applies the more range when being based on two, and applies the relatively less range when being based on the number more than two. In this case, when the change rate is 0.7 in the prediction for 30 minutes illustrated in FIG. 7 and there is past data (or two tracking results) for 10 minutes, a positional error is 8.468 km. In addition, when the change rate is 0.7 in the prediction for 30 minutes illustrated in FIG. 7 and there is past data (or three tracking results) for 20 minutes, a positional error is 6.164 km.

In addition, the control unit 240 stores the development prediction result in one or more convective cells in the storage unit 220.

In addition, the control unit 240 displays the development prediction result of one or more convective cells on the display unit 220. In this case, the development prediction result of the convective cell may be represented differently according to the kinds of convective cells (for example, a convective cell in which lightning is not observed and a convective cell in which lightning is observed).

In other words, the control unit 240 tracks the convective cell in which lightning is not observed, stores the path prediction result about the convective cell in which lightning is not observed in the storage unit 220, and displays it on the display unit 230.

In addition, the control unit 240 tracks the convective cell in which lightning is observed, stores the path prediction result, about the convective cell in which lightning is observed in the storage unit 220, and displays it on the display unit 230.

As described above, it is possible to detect the convective cell in the weather radar image, and to predict the path, of the detected convective cell on the basis of the plurality of information stored in advance.

Hereinafter, a control method of a system for predicting a path of a convective cell according to the invention will be described in detail with reference to FIG. 1 to FIG. 13.

Figure 8:
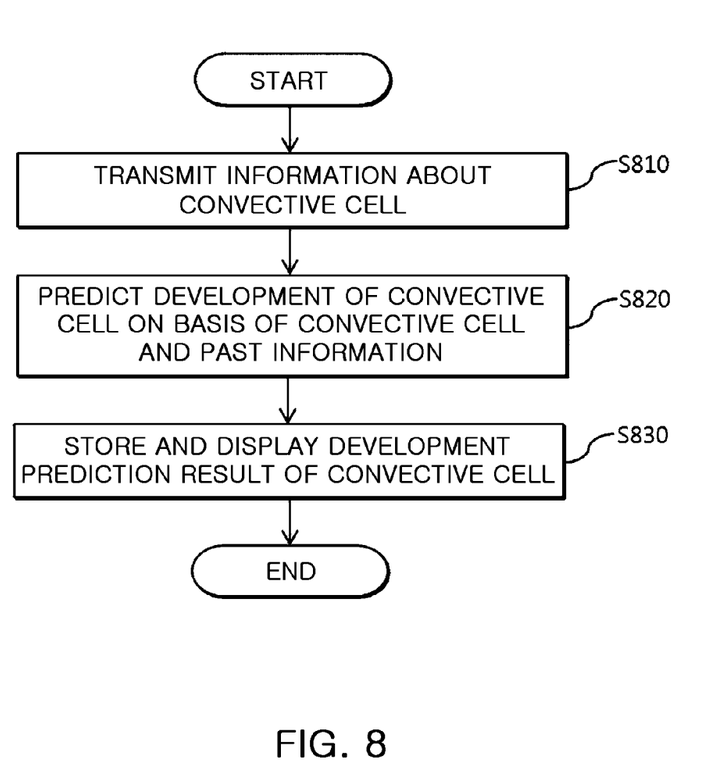
FIG.8 is a flowchart illustrating a control method of a system for predicting a path of a convective cell according to an embodiment of the invention.

FIG. 8 is a flowchart illustrating a control method of a system for predicting a path of a convective cell according to an embodiment of the invention.

First, the weather radar center system 100 detects one or more convective cell present in a radar image detected (captured, collected, observed, or sensed) through a weather radar (not illustrated).

In addition, the weather radar center system. 100 cells to the terminal 200.

Figure 9:
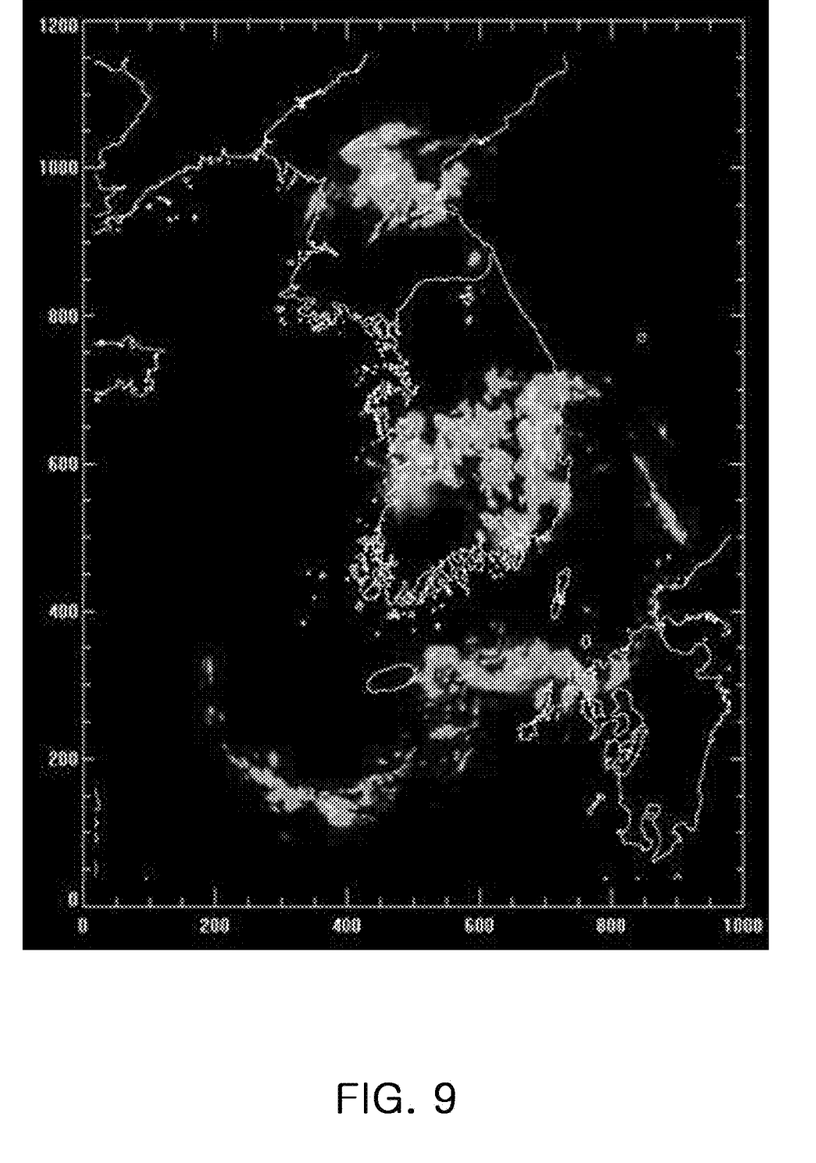
FIG. 9 is a diagram illustrating information about one or more detected. convective cells according to an embodiment of the invention.

For example, as illustrated in FIG. 9, the weather radar center system 100 detects one or more convective cells present in a radar image detected through the weather radar, and transmits information about one or more detected convective cell to the terminal 200 (S810).

Thereafter, the terminal 200 receives the information about one or more detected convective cells transmitted from the weather radar center system 100.

In addition, the terminal 200 predicts development of the convective cell (or a path of the convective cell) based on linear increase or decrease on the basis of the received information about one or more convective cell and the preset past information. In this case, the terminal 200 can predict a plurality of paths (or a plurality of paths for each prediction time) according to a first time, a second time, and the like which are preset.

In other words, the terminal 200 predicts development (or a path of one or more convective cells) of one or more received convective cells on the basis of the preset past information (for example, 6 pieces of past information in minimum), under the assumption that a storm tends to move along a straight line and growth and disappearance of the storm is taken along a linear tendency. In this case, when the development of one or more received convective cells is predicted, the terminal 200 can reflect (or apply) linear increase or decrease and/or parabolic increase or decrease about movement and strength of the convective cell. In addition, the terminal 200 predicts development of one or more received convective cells on the basis of (or with reference to) the past change tendency analyzed from the preset past information. In this case, the linear increase or decrease includes (or corresponds to) a change rate according to the time calculated with an exponentially decreased weight from the past information.

For example, the terminal 200 predicts development of one or more received convective cells based on linear increase or decrease on the basis of the preset past information for three years. In this case, the terminal 200 predicts the development of the convective cell by 30-minute prediction, and predicts the development of the convective cell by 60-minute prediction (S820).

Thereafter, the terminal 200 stores and displays the development prediction result of one or more convective cells (S830). In this case, the development prediction result of the convective cell may be represented differently according to the kinds of convective cells (for example, a convectvie cell in which lightning is not observed and a convective cell in which lightning is observed).

That is, the terminal 200 tracks the convective cell in which lightning is not observed, and stores and displays the path prediction result about the convective cell in which lightning is not observed.

In addition, the terminal 200 tracks the convective cell in which lightning is observed, and stores and displays the path prediction result about the convective cell in which lightning is observed.

Figure 10:
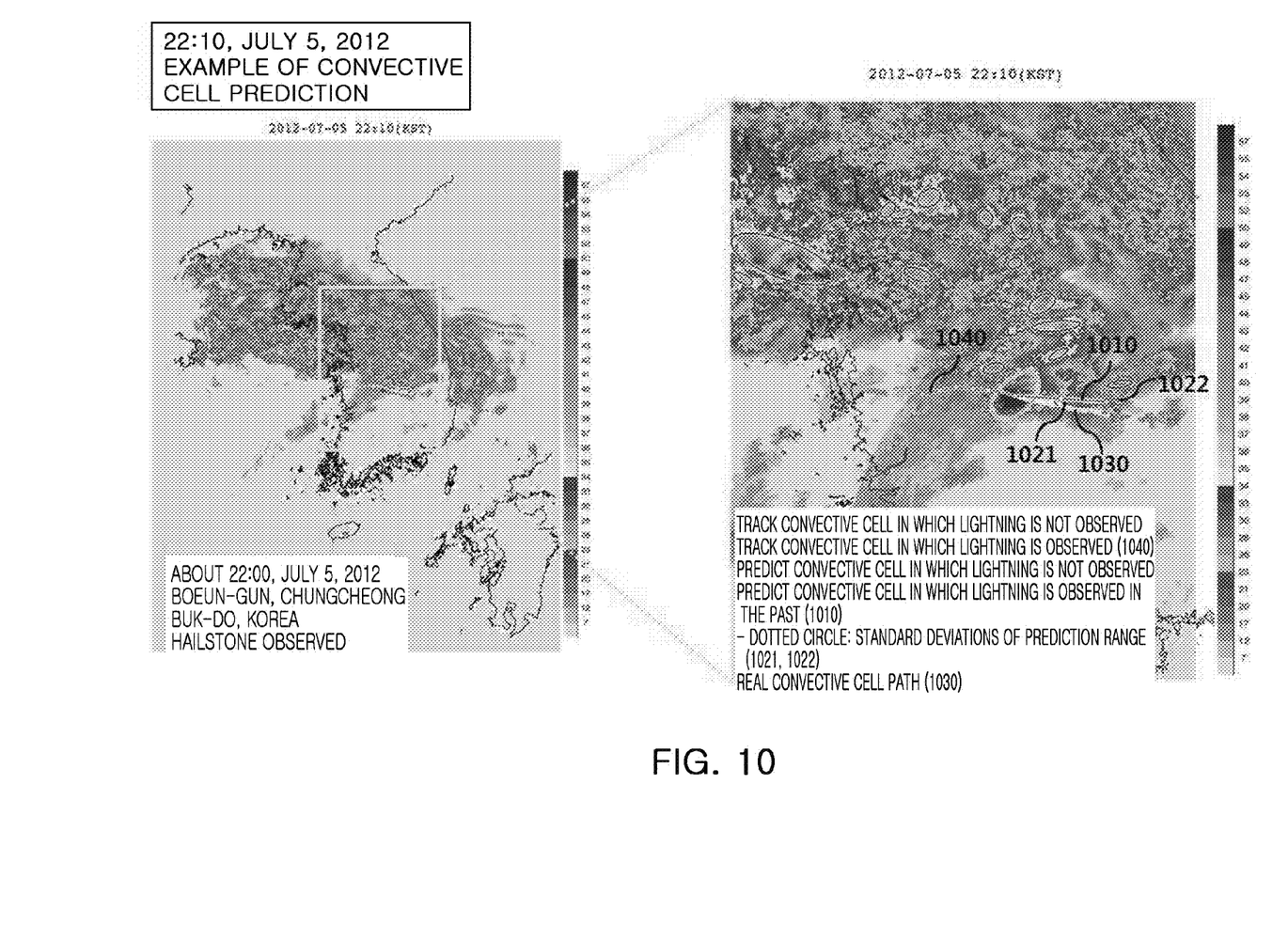
FIG. 10 and FIG. 11 are diagrams illustrating a development state of a convective cell in which liqhtninq is observed according to an embodiment of the invention.

For example, as illustrated in FIG. 10, the terminal 200 displays development states 1021 and 1022 of convective cells predicted on the basis of linear increase or decrease on the basis of the past information, in a predicted path 1010 of a convective cell in which lightning is observed. In this case, as illustrated in FIG. 10, as for the 1021 of the convective cell at the time close to the present time is smaller than a radius of the predicted development state 1022 of the convective cell at the time relatively far from the present time. In addition, as illustrated in FIG. 10, the terminal 200 displays a path 1030 of a real convective cell and a tracking result 1040 of the convective cell in which lightning was observed in the past.

Figure 11:
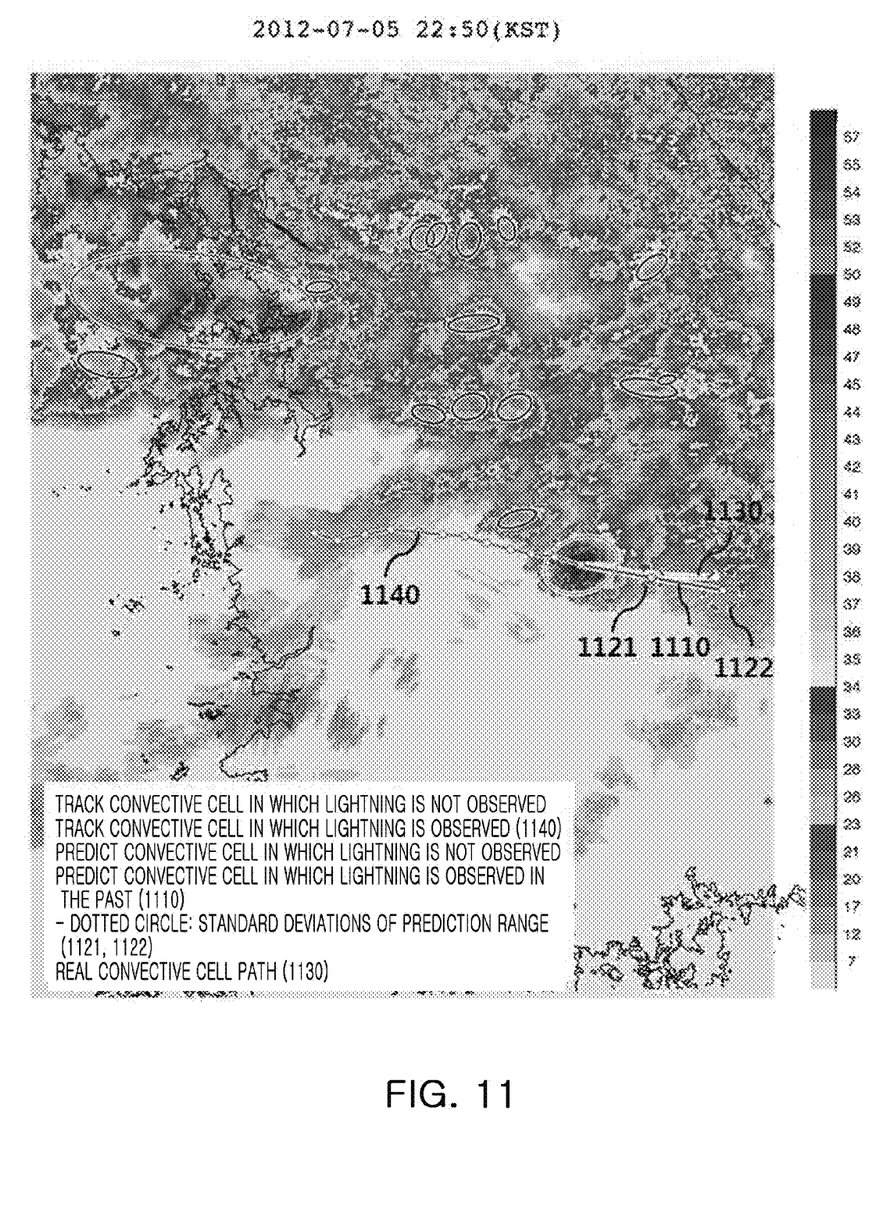

As another example, as illustrated in FIG. 11, the terminal 200 displays development states 1121 and 1122 of convective cells predicted on the basis of linear increase or decrease on the basis of the past information, in a predicted path 1110 of a convective cell in which lightning is observed. In addition, as illustrated in FIG. 11, the terminal 200 displays a path 1130 of a real convective cell and a tracking result 1140 of the convective cell in which lightning was observed in the past.

Figure 12:
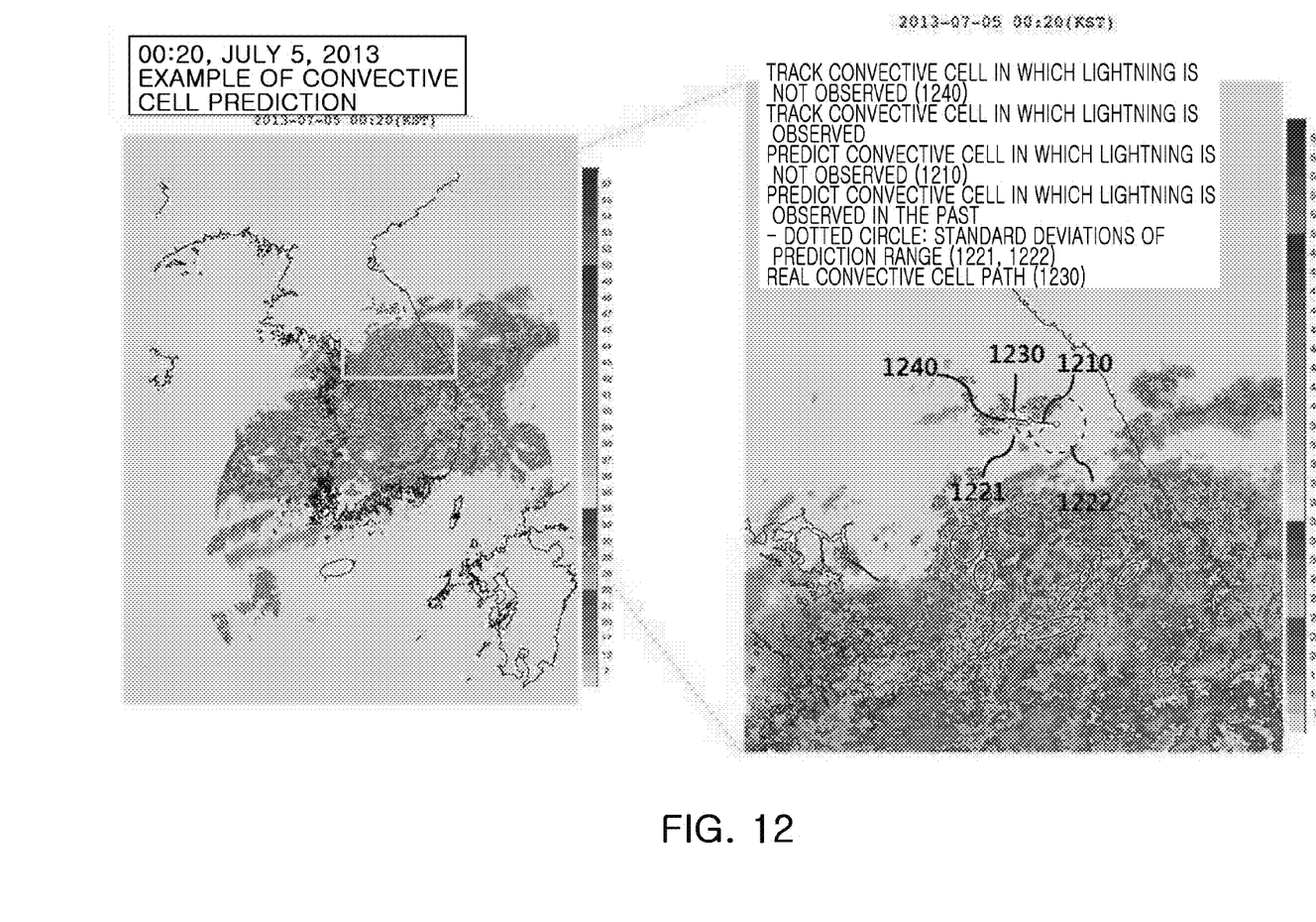
FIG. 12 and FIG. 13 are diagrams illustrating a development state of a convective cell in which lightning is not observed according to an embodiment of the invention.

As still another example, as illustrated in FIG. 12, the terminal 200 displays development states 1221 and 1222 of convective cells predicted on the basis of linear increase or decrease on the basis of the past information, in a predicted path 1210 of a convective cell in which lightning is not observed. In addition, as illustrated in FIG. 12, the terminal 200 displays a path 1230 of the convective cell in which lightning was not observed In the past, and a tracking result 1240 of the convective cell in which lightning was not observed in the past.

Figure 13:
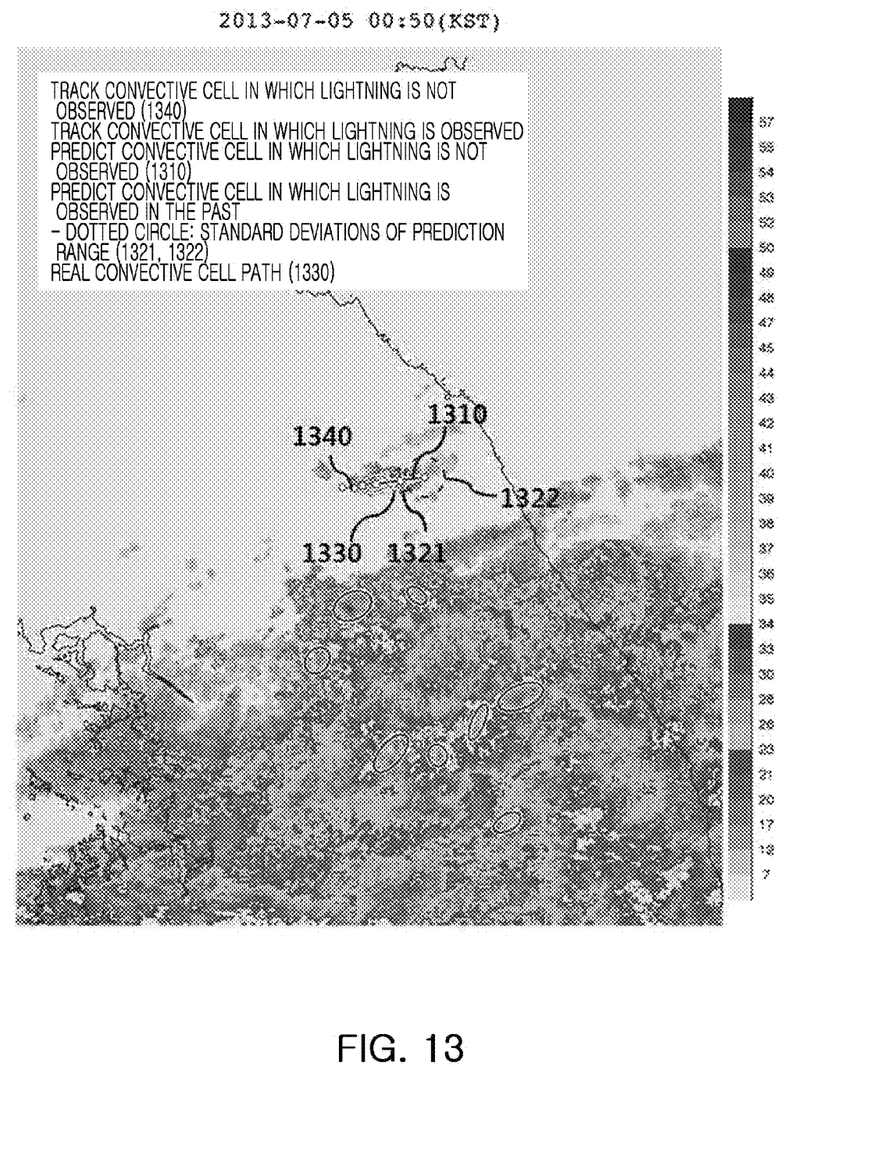

As still another example, as illustrated in FIG. 13, the terminal 200 displays development states 1321 and 1322 of convective cells predicted on the basis of linear increase or decrease on the basis of the past information, in a predicted path 1310 of a convective cell in which lightning is not observed. In addition, as illustrated in FIG. 13, the terminal 200 displays a path 1130 of the convective cell in which lightning was not observed in the past, and a tracking result 1140 of the convective cell in which lightning was not observed in the past (S830).

As described above, according to the embodiment of the invention, a convective cell is detected in a weather radar image, a path of the detected convective cell is predicted on the basis of a plurality of information stored in advance, and thus it is possible to guide various kinds of information about the convective cell including lightning in advance.

A person skilled in the art can modify and change the above description within the scope which does not deviate from the essential property of the invention. Accordingly, the embodiments disclose in the invent ion is not to limit the technical spirit of the invention but to describe it, and the scope of the technical spirit of the invention is not limited by such embodiments. The protection scope of the invention should be interpreted by the following Claims, and it should be interpreted that all the technical spirits within the scope equivalent thereto are included in the right scope of the invention.

According to the invention, a convective cell is detected in a weather radar image, and a path of the detected convective cell is predicted on the basis of a plurality of information stored in advance, thereby guiding various kinds of information about the convective cell including lightning in advance. Therefore, the invention can be widely used in a convective cell detection field, a storm prediction field, a weather forecasting field, and the like.

What is claimed is:

1. A system for predicting a path of a convective cell, comprising:
    a weather radar center system, comprised of a computer and a weather radar, which is configured to store a radar image detected from the weather radar and detect one or more convective cells present in the radar image, and transmit information about one or more convective cells that are detected including a property information of a 3-dimensional reflectivity cell and a property information of a 2-dimensional reflectivity cell to a terminal; and
    the terminal, wherein the terminal is configured to predict development of the convective cell based on linear increase or decrease on the basis of the information of one or more convective cells transmitted and a preset past information about a convective cell tracked in the past, and display a development prediction result of one or more convective cells,
    wherein the property information of the 3-dimensional reflectivity cell comprises a 3-dimensional center position and a volume, and
    wherein the property information of the 2-dimensional reflectivity cell comprises a center position and an area.

2. The system for predicting a path of a convective cell according to claim 1, wherein the terminal is configured to predict a plurality of paths for a preset prediction time.

3. The system for predicting a path of a convective cell according to claim 1, wherein the terminal is configured to predict the development of one or more convective cells on the basis of change tendency of the convective cell tracked in the past and analyzed from the preset past information about the convective cell tracked in the past.

4. The system for predicting a path of a convective cell according to claim 1, wherein the development prediction result of the convective cell is based on the preset past information, such that a positional error range is decreased as a number of convective cells in the preset past information increases, and the positional error range is increased as the number convective cells in the preset past information decreases.

5. The system for predicting a path of a convective cell according to claim 1, wherein the property information of the 3-dimensional reflectivity cell further comprises a maximum reflectivity, an average reflectivity, an altitude and a position of maximum reflectivity, and wherein the property information of the 2-dimensional reflectivity cell further comprises lengths of a major axis and a minor axis of a representative ellipse, an inclination of the major axis, a vertically integrated liquid-water content, a vertically integrated liquid-water content density and an upper layer vertically integrated liquid-water content.

6. A control method of a system for predicting a path of a convective cell, comprising:

detecting, through a weather radar center system which is comprised of a computer and a weather radar, one or more convective cells present in a radar image;

transmitting information about one or more convective cells that are detected, including a first property information of a 3-dimensional reflectivity cell, the first property information comprising a 3-dimensional center position and a volume, and a second property information of a 2-dimensional reflectivity cell, the second property information comprising a center position and an area, to a terminal;

predicting, through the terminal, development of the convective cell based on linear increase or decrease on the basis of the information of one or more convective cells transmitted and a preset past information about a convective cell tracked in the past; and displaying, through the terminal, a development prediction result of one or more convective cells.

7. The control method of a system for predicting a path of a convective cell according to claim 6, wherein in the predicting of the development of convective cell, the development of the convective cell of one or more convective cells is predicted on the basis of change tendency of the convective cell tracked in the past and analyzed from the preset past information about the convective cell tracked in the past.

8. The control method of a system for predicting a path of a convective cell according to claim 6, wherein the development prediction result of the convective cell is based on the preset past information, such that a positional error range is decreased as a number of convective cells in the preset past information increases, and the positional error range is increased as the number of convective cells in the preset past information decreases.

9. The control method of a system for predicting a path of a convective cell according to claim 6, wherein the first property information of the 3-dimensional reflectivity cell further comprises a maximum reflectivity, an average reflectivity, an altitude and a position of maximum reflectivity, and wherein the second property information of the 2-dimensional reflectivity cell further comprises lengths of a major axis and a minor axis of a representative ellipse, an inclination of the major axis, a vertically integrated liquid-water content, a vertically integrated liquid-water content density and an upper layer vertically integrated liquid-water content.

* * * * *